United States Patent
Barrett

(10) Patent No.: US 10,641,903 B2
(45) Date of Patent: May 5, 2020

(54) OPTIMIZED GLOBAL POSITIONING SYSTEM CORRECTION MESSAGE FOR INTEROPERABLE TRAIN CONTROL MESSAGING TRANSPORT

(71) Applicant: BNSF Railway Company, Fort Worth, TX (US)

(72) Inventor: James M. Barrett, Haslet, TX (US)

(73) Assignee: BNSF Railway Company, Fort Worth, TX (US)

( * ) Notice: Subject to any disclaimer, the term of this patent is extended or adjusted under 35 U.S.C. 154(b) by 323 days.

(21) Appl. No.: 15/721,498

(22) Filed: Sep. 29, 2017

(65) Prior Publication Data

US 2019/0101651 A1    Apr. 4, 2019

(51) Int. Cl.
*G01S 19/07* (2010.01)
*B61L 25/02* (2006.01)
*B61L 27/00* (2006.01)

(52) U.S. Cl.
CPC ............ *G01S 19/07* (2013.01); *B61L 25/025* (2013.01); *B61L 27/0077* (2013.01); *B61L 2205/04* (2013.01)

(58) Field of Classification Search
CPC .......... G01S 19/20; G01S 19/25; G01S 19/41; B61L 27/077; B61L 27/025; B61L 27/04
See application file for complete search history.

(56) References Cited

U.S. PATENT DOCUMENTS

| | | |
|---|---|---|
| 5,867,122 A | 2/1999 | Zahm et al. |
| 5,977,909 A | 11/1999 | Harrison et al. |
| 8,374,291 B1 | 2/2013 | Himsoon et al. |
| 9,680,936 B2* | 6/2017 | Wust ........................ G06F 16/80 |
| 2007/0200755 A1 | 8/2007 | Hamilton et al. |
| 2011/0075641 A1 | 3/2011 | Siriwongpairat et al. |
| 2011/0210890 A1 | 9/2011 | Laine |
| 2014/0184442 A1 | 7/2014 | Large et al. |
| 2016/0091320 A1 | 3/2016 | Kapp et al. |
| 2016/0227592 A1 | 8/2016 | Potter et al. |
| 2017/0113708 A1 | 4/2017 | Ferrari et al. |
| 2018/0252818 A1* | 9/2018 | Sato ........................ G01S 19/07 |
| 2018/0284293 A1* | 10/2018 | Pan ........................ G01S 19/45 |

(Continued)

OTHER PUBLICATIONS

U.S. Congress, Office of Technology Assessment, "Federal Research and Technology for Aviation", Sep. 1994, 80 pages.

(Continued)

*Primary Examiner* — Marc Anthony Armand

(57) ABSTRACT

A method for a precision navigation system (PNS), the PNS, and a back office (BO) server for optimizing an error correction message for interoperable train control messaging transport (ITCM) are provided. The method includes simultaneously receiving (i) a first message containing error correction data from a reference station, and (ii) a second message containing satellite identification information from a rover; determining satellites that are common to the error correction data and the satellite identification information; normalizing the data based on the determined satellites; generating an optimized error correction message based on the normalized data of the determined satellites; and transmitting the standardized error correction message to the rover.

20 Claims, 7 Drawing Sheets

(56) References Cited

U.S. PATENT DOCUMENTS

2019/0250277 A1* 8/2019 Miya ...................... G01S 19/07

OTHER PUBLICATIONS

International Search Report dated Dec. 6, 2018 in connection with International Patent Application No. PCT/US2018/053798, 2 pages.
Written Opinion of the International Searching Authority dated Dec. 6, 2018 in connection with International Patent Application No. PCT/US2018/053798, 6 pages.

* cited by examiner

OPTIMIZED GLOBAL POSITIONING SYSTEM CORRECTION MESSAGE FOR INTEROPERABLE TRAIN CONTROL MESSAGING TRANSPORT

TECHNICAL FIELD

The present disclosure relates generally to railroad operations. More particularly, the present disclosure relates to an optimized error correction message for interoperable train control messaging transport.

BACKGROUND

An interoperable train control messaging (ITCM) system provides a custom messaging solution that allows applications to exchange messages regardless of their physical location or type of connectivity.

SUMMARY

Embodiments of the present disclosure provide a precision navigation system (PNS), back office server in the PNS, and method for optimized global positioning system correction message for interoperable train control messaging transport. The method provides an optimized message that improves the functioning of computer technology by reducing a size of a message in order to reduce the transceiver resources. The method also provides an improvement to the technical field of navigation systems by reducing the amount of data required to transmit an error correction message.

In one example embodiment, a precision navigation system (PNS) provides for optimizing an error correction message for interoperable train control messaging transport (ITCM) includes a rover, a reference station and a back office (BO) server. The rover determines satellite identification information based on satellites in view of the rover, and transmits the satellite information to a back office (BO) server. The reference station receives error correction data from satellites in view of the reference station and transmits the error correction data to the BO server. A back office (BO) server simultaneously receives (i) a first message containing error correction data from a reference station, and (ii) a second message containing satellite identification information from a rover; determines satellites that are common to the error correction data and the satellite identification information, normalizes the data based on the determined satellites, generates an optimized error correction message based on the normalized data of the determined satellites, and transmits the standardized error correction message to the rover.

In another example embodiment, a BO server in a PNS provides for optimizing an error correction message for interoperable train control messaging transport (ITCM) is provided. The BO server includes a transceiver, a storage, and a processor operatively couple to the transceiver. The processor simultaneously receives (i) a first message containing error correction data from a reference station, and (ii) a second message containing satellite identification information from a rover; determines satellites that are common to the error correction data and the satellite identification information, normalizes the data based on the determined satellites, generates an optimized error correction message based on the normalized data of the determined satellites, and transmits the standardized error correction message to the rover.

In another example embodiment, a method provides for optimizing an error correction message for interoperable train control messaging transport (ITCM). The method includes simultaneously receiving (i) a first message containing error correction data from a reference station, and (ii) a second message containing satellite identification information from a rover; determining satellites that are common to the error correction data and the satellite identification information; normalizing the data based on the determined satellites; generating an optimized error correction message based on the normalized data of the determined satellites; and transmitting the standardized error correction message to the rover.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any type of suitably-arranged device or system.

Figure 1:
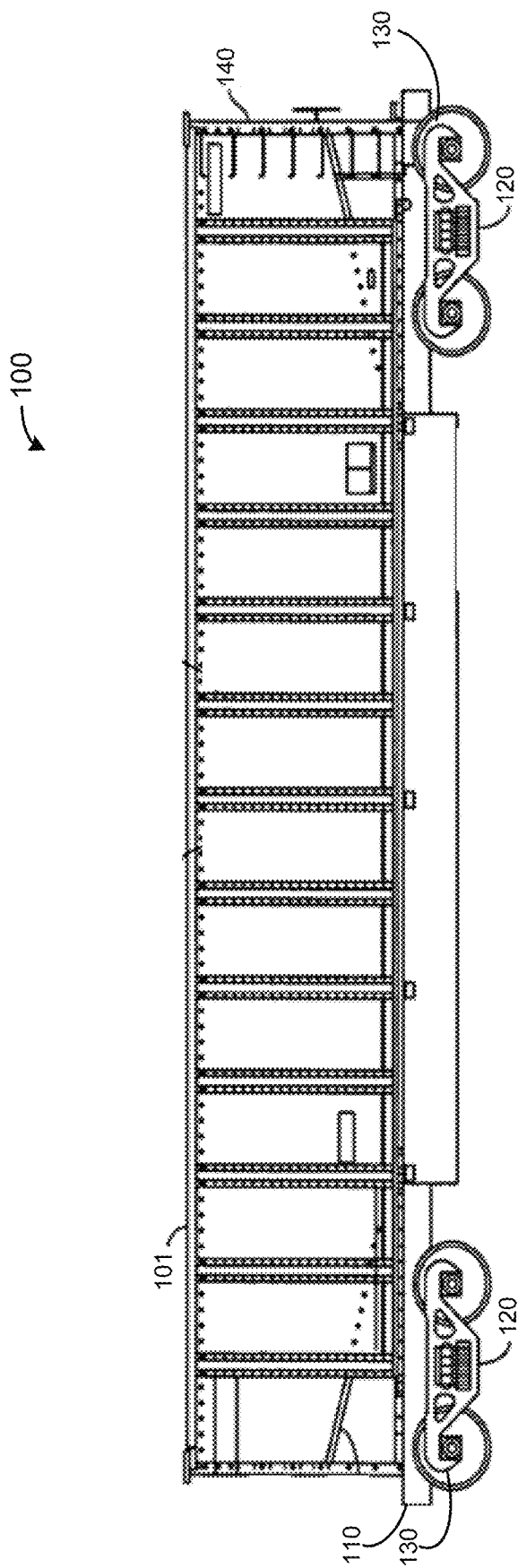
FIG. 1 illustrates an example side view of a railcar 100 in accordance with various embodiments of the present disclosure.

FIG. 1 illustrates a side view of a railcar 100 in accordance with various embodiments of the present disclosure. While a gondola railcar is shown in FIG. 1, the principles of the present disclosure are equally applicable to other types of railcars. The embodiment of railcar 100 shown in FIG. 1 is for illustration only. Other embodiments of the railcar 100 could be used without departing from the scope of this disclosure.

The railcar 100 includes an elongated receptacle 101, a base section 110, the pair of car trucks 120, and a side frame 130. Various embodiments also include an upper section 140. The railcar 100 may be any type of railroad car suitable for traveling along a railroad. For example, the railcar 100 may be any one of a passenger car, freight car, or any other type of railcar known to one of ordinary skill in the art.

The elongated receptacle 101 is supported on a pair of conventional railroad car trucks 120. The receptacle 101 is adapted to receive bulk materials, for example coal. The base section 110 may be of any suitable dimensions, but in a certain embodiment is configured and spaced according to standard railroad specifications for a railcar 100. In some embodiments, the base section 110 is coupled to the upper section 140. In other embodiments, the base section 110 and the upper section 140 may be a single element that cannot be separated. In various embodiments, the upper section 140 may be a shipping container, a passenger car, or any other suitable upper section of a railcar known to one of ordinary skill in the art.

Figure 2:
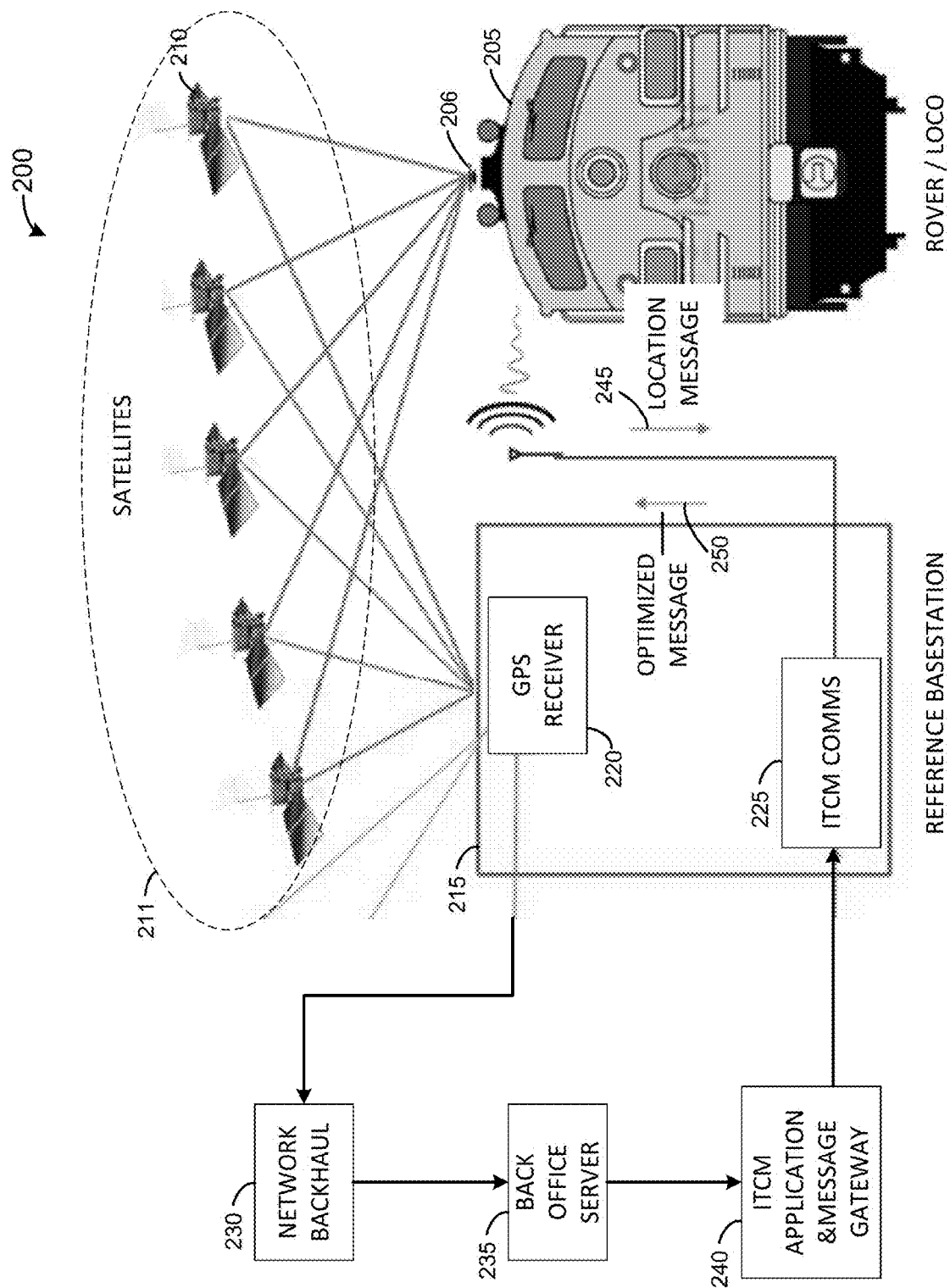
FIG. 2 illustrates an example precision navigation system (PNS) 200 for optimized global positioning system correction message for ITCM transport according to the various embodiments of the present disclosure.

The car trucks 120 are coupled to the base section 110 and provide the railcar's 100 connection to the railroad track 215 (illustrated in FIG. 2). The car trucks 120 are comprised of wheels, which guide the railcar along the railroad track, the side frame 130, and one or more axles coupled to the wheel. Any suitable pair of car trucks 120 known to one of ordinary skill in the art may be utilized in the railcar 100.

The side frame 130 couples to the axle of the car truck 120, and serves as the axle's connection to the base section 110 of the railcar 100. Further, a pair of slots 225 (illustrated in FIG. 2) is included at each end of the side frame 130. The slots 225 in the side frame 130 may be of any diameter equal to or greater than the diameter of a standard tow rope 240. In various embodiments, the tow rope 240 has a diameter of approximately 0.5 inches. In various embodiments, the tow rope 240 has a diameter of up to 0.75 inches. The tow rope 240 is discussed in greater detail below. In certain embodiments, the slots 225 in the side frame 130 serves as the attachment point for the tow rope 240 when the railcar 100 is disabled and being towed or serving as the tow car which tows a disabled car.

Although FIG. 1 illustrates one example of a railcar 100, various changes may be made to FIG. 1. For example, the components of the railcar 100 are for illustration only. Various components in FIG. 1 could be omitted, combined, or further subdivided and additional components could be added according to particular needs.

FIG. 1 illustrates a side view of a railcar 100 in accordance with various embodiments of the present disclosure. While a gondola railcar is shown in FIG. 1, the principles of the present disclosure are equally applicable to other types of railcars. The embodiment of railcar 100 shown in FIG. 1 is for illustration only. Other embodiments of the railcar 100 could be used without departing from the scope of this disclosure.

The railcar 100 includes an elongated receptacle 101, a base section 110, the pair of car trucks 120, and a side frame 130. Various embodiments also include an upper section 140. The railcar 100 may be any type of railroad car suitable for traveling along a railroad. For example, the railcar 100 may be any one of a passenger car, freight car, or any other type of railcar known to one of ordinary skill in the art.

The elongated receptacle 101 is supported on a pair of conventional railroad car trucks 120. The receptacle 101 is adapted to receive bulk materials, for example coal. The base section 110 may be of any suitable dimensions, but in a certain embodiment is configured and spaced according to standard railroad specifications for a railcar 100. In some embodiments, the base section 110 is coupled to the upper section 140. In other embodiments, the base section 110 and the upper section 140 may be a single element that cannot be separated. In various embodiments, the upper section 140 may be a shipping container, a passenger car, or any other suitable upper section of a railcar known to one of ordinary skill in the art.

The car trucks 120 are coupled to the base section 110 and provide the railcar's 100 connection to the railroad track. The car trucks 120 are comprised of wheels, which guide the railcar along the railroad track, the side frame 130, and one or more axles coupled to the wheel. Any suitable pair of car trucks 120 known to one of ordinary skill in the art may be utilized in the railcar 100.

The side frame 130 couples to the axle of the car truck 120, and serves as the axle's connection to the base section 110 of the railcar 100.

Although FIG. 1 illustrates one example of a railcar 100, various changes may be made to FIG. 1. For example, the components of the railcar 100 are for illustration only. Various components in FIG. 1 could be omitted, combined, or further subdivided and additional components could be added according to particular needs.

FIG. 2 illustrates a precision navigation system (PNS) 200 for optimized global positioning system correction message for interoperable train control messaging transport according to the various embodiments of the present disclosure. The embodiment of PNS 200 shown in FIG. 2 is for illustration only. Other embodiments of the PNS 200 could be used without departing from the scope of this disclosure.

The PNS 200 includes a rover 205, a plurality of satellites 210 in at least one satellite constellation 211, a reference base station 215, a network backhaul 230, a back office (BO) server 235 and an interoperable train control messaging (ITCM) gateway 240. The PNS 200 is comprised of strategically located reference base stations 215 utilizing tri-band, multi-constellation global positioning system (GPS) receivers placed approximately 15-30 miles apart that provides an optimized correction message to mobile units (rover 205) in a normalized and railroad standardized ITCM message format. The PNS 200 utilizes the existing PTC ITCM communications network and messaging system along with BO data to determine when rovers 205 are in the area. For efficiencies, the PNS 200 uses a modified location message from the rover 205 containing GNSS satellite ID information to synchronize the satellites 210 seen by both the reference station 215 and rover 205. This enables an optimized correction message to fit into a PTC ITCM message format and allows the PNS 200 to only transmit optimized correction messages when a rover 205 is in the area.

A rover 205 is any railroad asset equipped with a GNSS receiver for location purpose (e.g., locomotives, MOW vehicles, Geocars, EAM tablets). Rovers 205 can be equipped with one or two tri-band, multi-constellation GNSS receivers 206 capable of accepting the optimized correction message 250 via the PTC ITCM communications network. An ICTM communicator on the rover 205 can also transmit a message to the base station 215 with location or GNSS information of the rover 205.

The use of the PNS 200 enables the rover equipment (onboard precision navigation module) to achieve sub meter accuracy with high availability. This level of accuracy is required as a starting reference point for PNS 200 utilizing inertia modules, sensors or dead reckoning algorithms.

The reference base station 215 includes a GNSS receiver 220 and an ITCM communicator 225. The GNSS receiver 220 can be a one or two tri-band, multi-constellation GNSS receivers 206 and the ITCM communicator 225 is used to transmit and receive messages from the rover 205. The PNS 200 uses a number of satellite constellations 211. The baseline GPS satellite constellation consists of 24 satellites positioned in six earth-centered orbital planes with four operation satellites and a spare satellite slot in each orbital plane. Hence, the GPS system can support a constellation of up to thirty satellites in orbit. The GLONASS satellite system completed full restoration to a full orbital constellation of 24 satellites. In contrast to GPS, the 24 GLONASS operational satellites are distributed over three orbital planes with eight satellites per plane. When the European Galileo satellite navigation system is fully operational, there will be 30 satellites with ten satellites occupying each of three orbital planes. The Chinese BeiDou constellation adds the fourth component to the GNSS constellation. When fully operational, BeiDou will be comprised of 35 satellites with 27 satellites distributed in medium Earth orbit (MEO). For purposes of this analysis, only the 27 MEO satellites will be included. Analysis has been performed with the GPSoft Satellite Navigation Toolbox. While GPS, GLONASS and Galileo orbital parameters were included, BeiDou was not.

The fact that GNSS orbital configurations differ results in significantly improved satellite visibility, spatial geometry and dilution of precision. As observed, only marginal improvement is provided by BeiDou augmentation. These improvements in turn bring significantly improved positioning solution convergence, accuracy, continuity and reliability to precise positioning.

Figure 3:
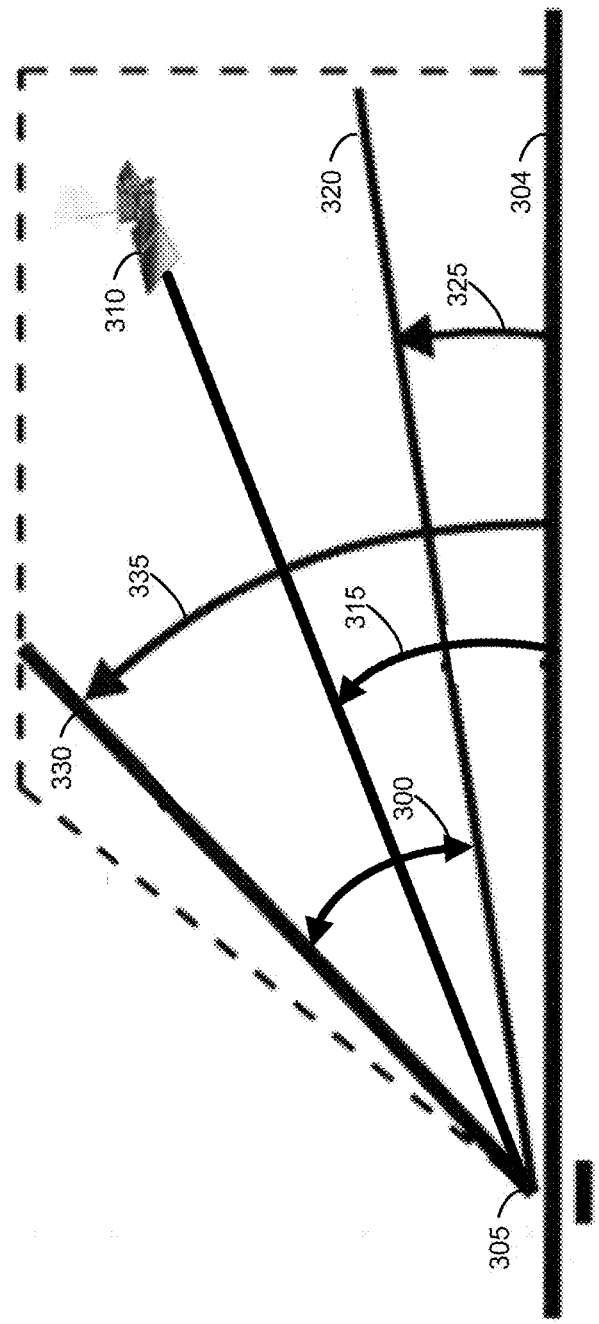
FIG. 3 illustrates an example satellite viewing angle 300 from a origin point 305 in accordance with various embodiments of the present disclosure.

FIG. 3 illustrates an example satellite viewing angle 300 from an origin point 305 in accordance with various embodiments of the present disclosure. The embodiment of viewing angle 300 shown in FIG. 3 is for illustration only. Other embodiments of the viewing angle 300 could be used without departing from the scope of this disclosure.

Each of the rover 205 and base station 215 operate using the satellite constellations 211. Each satellite 310 has a satellite angle 315 above the horizon 304 from the viewpoint of the object at the point of origin 305.

The viewing angle 300 is used to optimize the selection of satellites 310 for use in determining the error correction. The viewing angle 300 is the angle in which the satellites are able to communicate with an object at the point of origin 305. The viewing angle 300 represents a range that satellite angles 315 are within for efficient communicating with a receiver located at the point of origin 305. The viewing angle 300 is an angle that represent the range between the masking line 320 and the maximum line 330 or the angle that is difference between the maximum angle 335 and the masking angle 325.

The viewing angle 300 has a point of origin 305. The point of origin 305 represents the current location of the rover 205 or the base station 215. The point of origin 305 is located on the horizon 304.

The viewing angle 300 has a mask line 320 at a mask angle 325 from the horizon 304. Satellites that are below the mask line 320 or have a satellite angle 315 is less than the masking angle 320 are not able to communicate with the object at the point of origin.

The viewing angle 300 also has a maximum line 330 at a maximum angle 335 from the horizon 304. Satellites that are above the maximum line 330 or have a satellite angle 315 greater than the maximum angle are not able to optimally communicate with the receiver at the point of origin 305.

Figure 4:
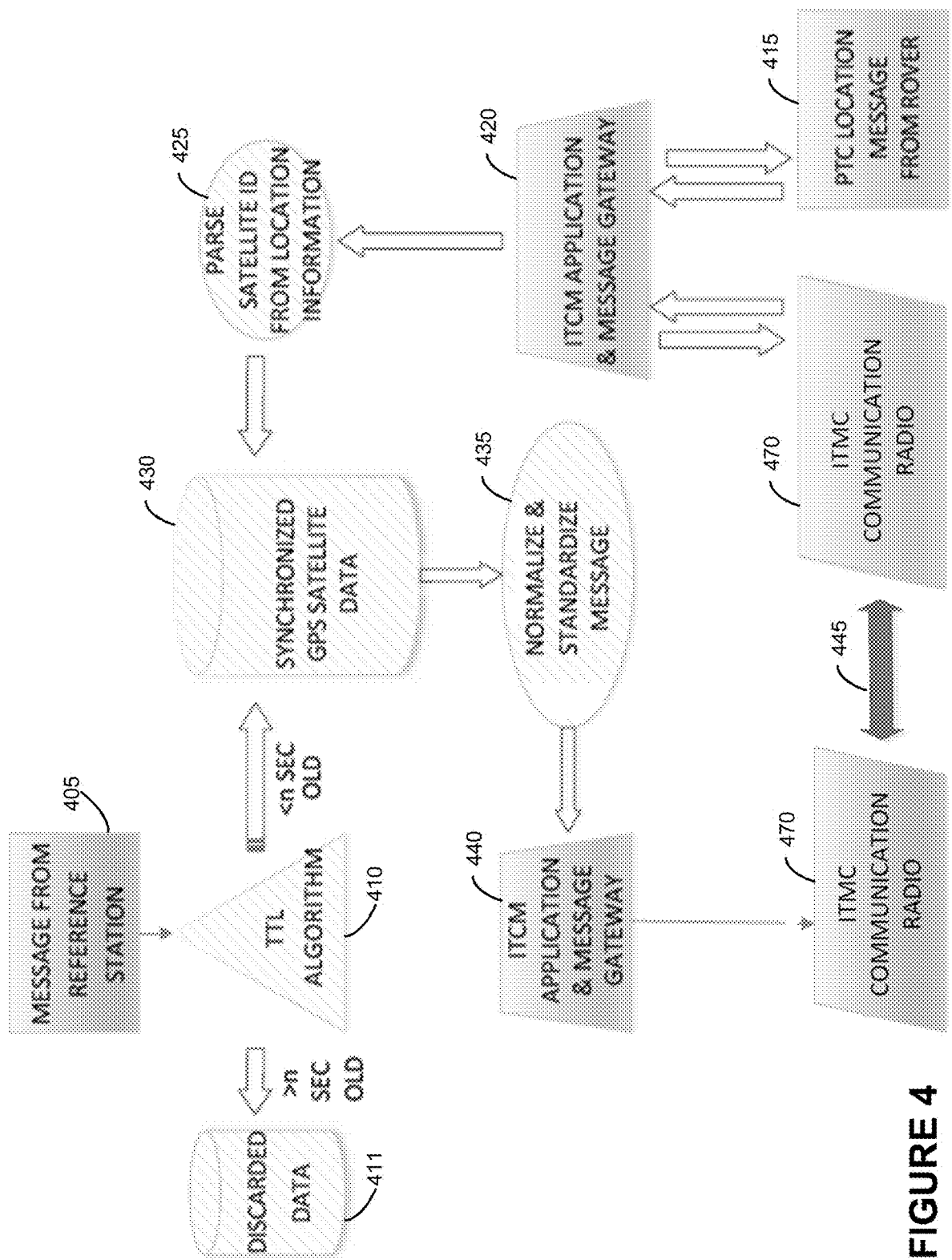
FIG. 4 illustrates an example flowchart for optimized global positioning system correction message for ITCM transport according to the various embodiments of the present disclosure.

FIG. 4 illustrates an example flowchart 400 for optimized global positioning system correction message for ITCM transport according to the various embodiments of the present disclosure. The embodiment of flowchart 400 shown in FIG. 4 is for illustration only. Other embodiments of the flowchart 400 could be used without departing from the scope of this disclosure.

Error correction data is received at the reference base station 215 via a tri-band, multi constellation GNSS receiver 220. The GNSS receiver 220 filters all GNSS satellites 210 that are outside a viewing angle 300 of the sky. This filtered error correction message 405 is passed on to the BO server 235 via the network backhaul 230.

The BO server 235 determines, using a time to live (TTL) algorithm 410, if the messages 405 have been stored less than a predetermined amount (n) of time and passes the message 405 to the GNSS ID comparer application. Messages that are older than the predetermined amount of time are determined as discarded data 411. An example of the predetermined time could be four seconds.

Simultaneously with the message 405 received from the base station 215, PTC location messages 245, from the rover 205, containing GNSS satellite ID information is sent to the BO server 235.

In operation 435, the GNSS ID comparer application's role is to compare GNSS IDs from both messages and determine a number of the best satellites that are common to both messages (rover 205 & base station 215). The number can be predetermined, such a determining the best five satellites.

In operation 440, this data is then passed to an application that normalized the data and creates a standardized error correction message.

In operation 440, the "optimized" error correction message 250 is passed to the ITCM application and message gateway 240 and processed into an ITCM error correction message 250.

In operations 445 and 450, the ITCM error correction message 250 is routed back to the originating reference base station 215 and transmitted to the rover 205 via the ITCM communication network 470. The rover ITCM communication radio 470 receives the "optimized" error correction message 250 and passes it to the application & message gateway 420 on the rover 205. The ITCM headers are stripped off and the error correction message 250 is routed to the tri-band, multi-constellation GNSS receiver 206.

Figure 5:
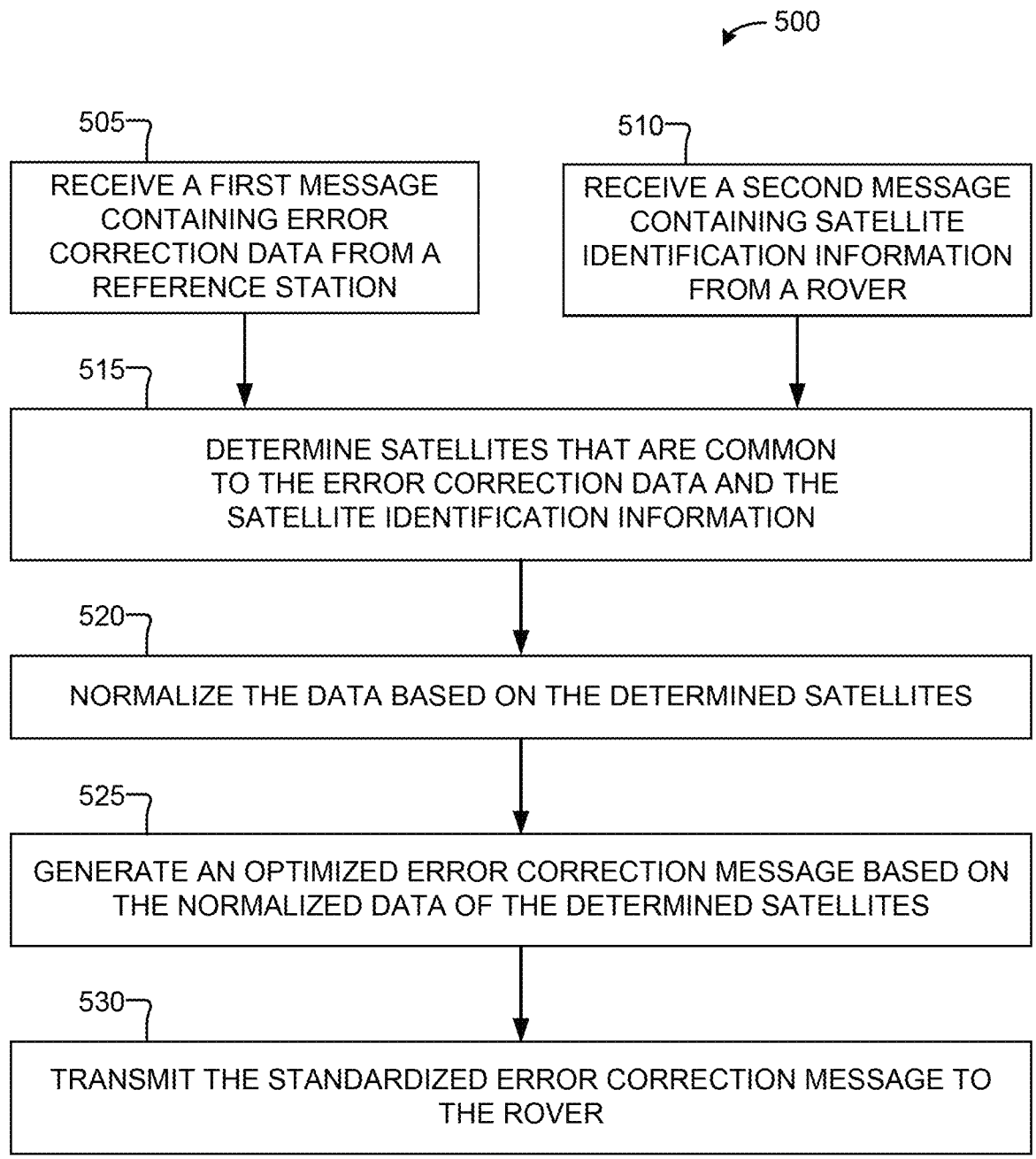
FIG. 5 illustrates an example method for optimized global positioning system correction message for ITCM transport according to the various embodiments of the present disclosure.

FIG. 5 illustrates an example process 500 for optimized global positioning system correction message for interoperable train control messaging transport in accordance with various embodiments of the present disclosure. For example, the process 500 could be performed BO server 235 in PNS 200 illustrated in FIG. 2.

In operation 505, the BO server 235 receives a first message 645 containing error correction data 647 from a reference station 615. The GNSS receiver 220 of the reference station 215 filters out satellites 210 that are outside of a viewing angle 300. The first messages 645 that are older than a predetermined amount of time are discarded. The size of the first message 645 is based on an amount of satellites 210 observed by the reference station 215.

In operation 510, the BO server 235 receives a second message containing satellite identification information 648 from a rover 205. The rover 205 is in the general area of a reference station 215 when the BO server 235 receives the second message. The second message is timestamped and compared to a first message with a similar time stamp. When a second message is not received to coordinate with the first message, the first message is discarded. The rover filters out the satellites that are not within a viewing angle of the rover.

In operation 515, the BO server 235 determines satellites 210 that are common to the error correction data 647 and the satellite identification information 648. In other words, the BO server determines which servers are in a viewing angle from both the perspective of the reference station and the rover.

In operation 520, the BO server 235 normalizes the data based on the determined satellites 210. The BO server combines the data from the error correction data 647 and the satellite identification information 648 necessary for generating the optimized correction message. The BO server determines an amount of error correction data or an amount of satellites required for accurate locating of the rover. The BO server identifies the satellites with the strongest signals at the rover within the amount of satellites or an amount of satellites corresponding to the determined amount of error correction data.

In operation 525, the BO server 235 generates an optimized error correction message based on the normalized data of the determined satellites 210. The size of the optimized error correction message 250 is determined based on an amount of satellites 210 required for error correction of the location by the rover 205. The size of the optimized error correction message is less than the size of the first message. The amount of bits for the size of the optimized error correction message is determined by the following equation:

$$\text{Number of Bits} = 169 + N_{sat} * (10 + 43 * N_{sig}),$$

where $N_{sat}$ is a number of satellites in view of the reference station and $N_{sig}$ is a number of signals used.

In operation 530, the BO server 235 transmits the standardized error correction message to the rover 205. The rover 205 receives and uses the data to perform accurate location services.

Although FIG. 5 illustrates one example of a process 500 for optimized global positioning system correction message for interoperable train control messaging transport, various changes may be made to FIG. 5. For example, although depicted herein as a series of steps, the steps of the process could overlap, occur in parallel, occur in a different order, or occur multiple times.

Figure 6:
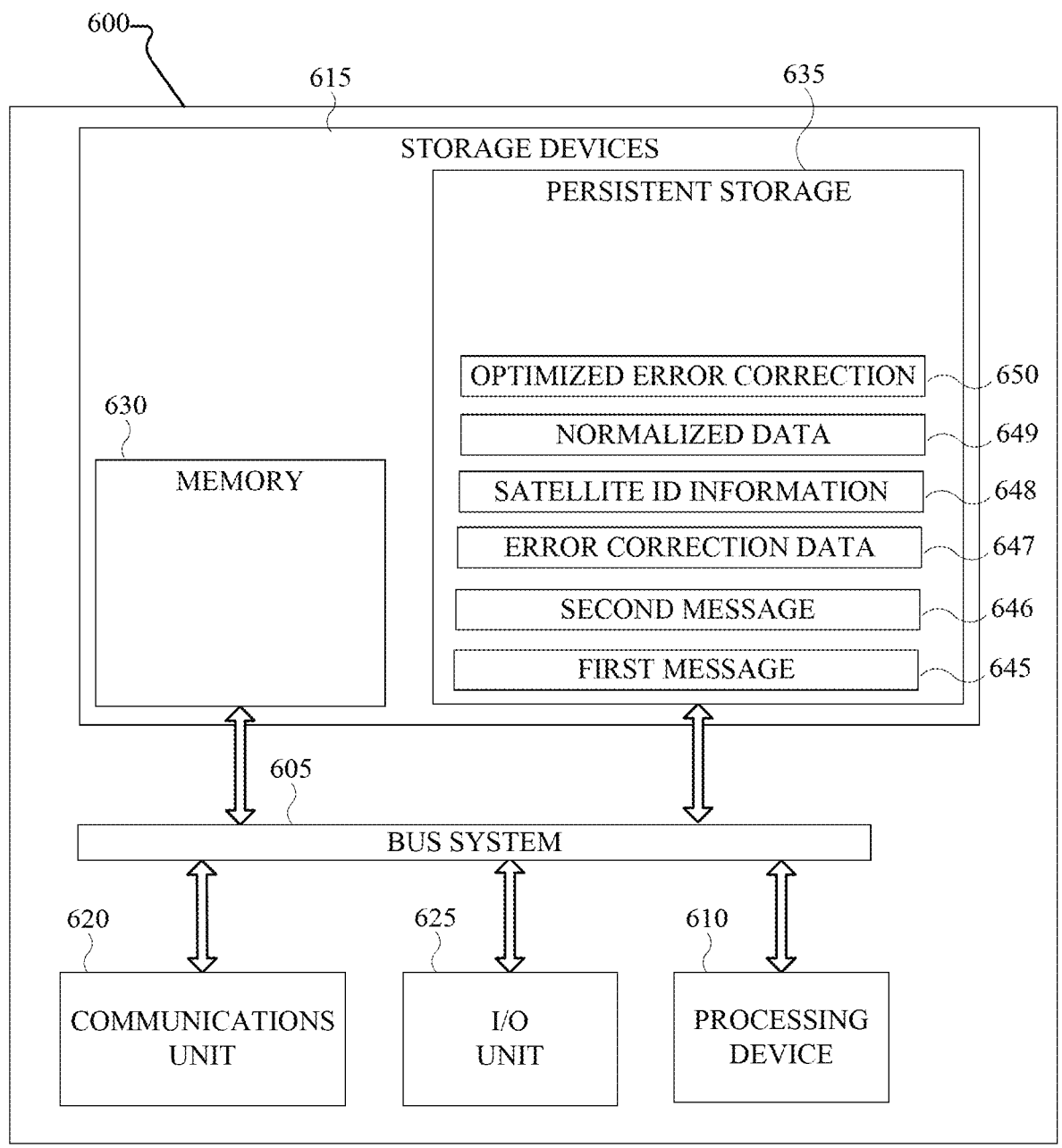
FIGS. 6 and 7 illustrate example devices in a computing system according to this disclosure.
Figure 7:
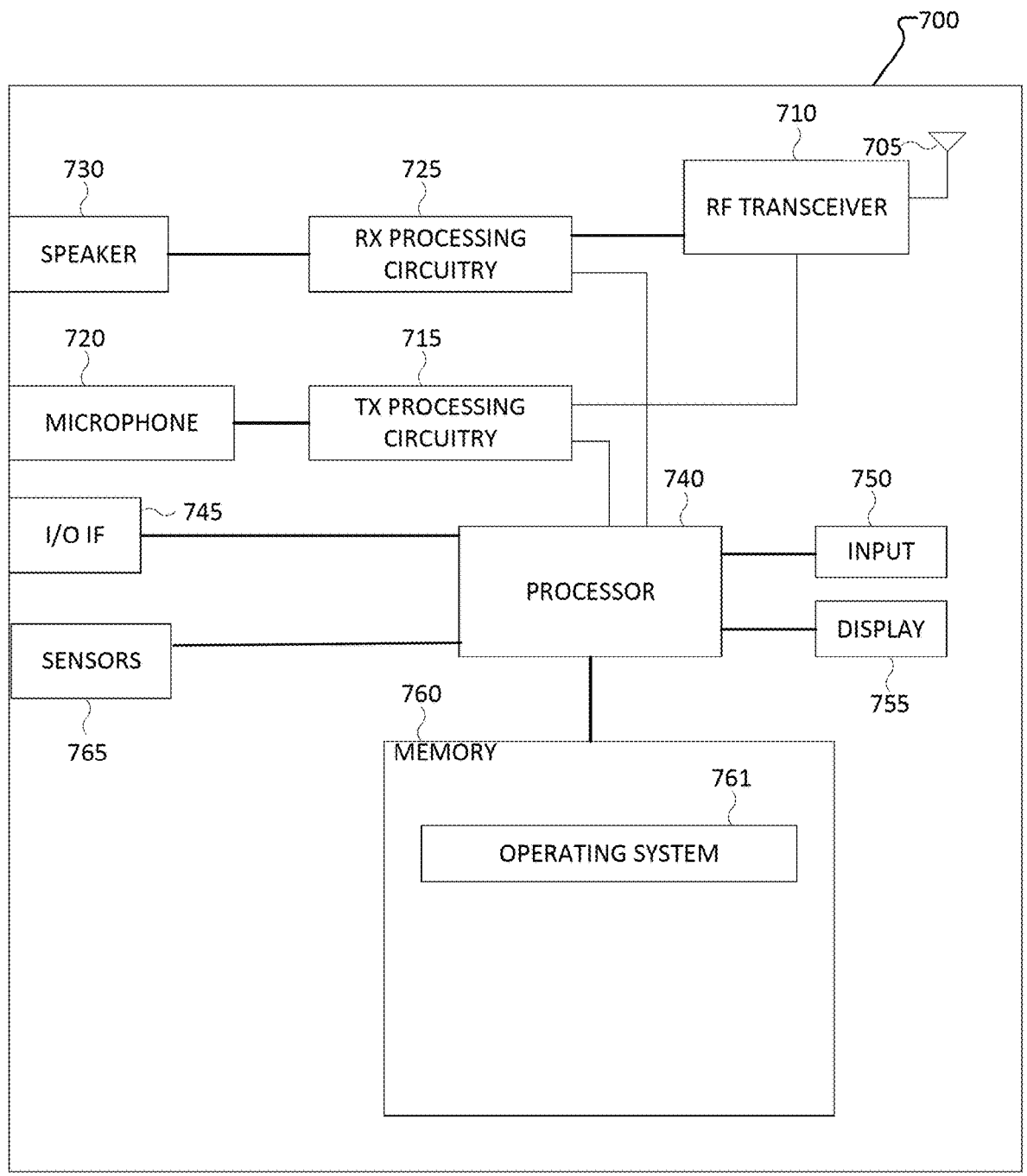

FIGS. 6 and 7 illustrate example devices in a computing system according to this disclosure. In particular, FIG. 6 illustrates an example server 600 for optimizing an error correction message for interoperable train control messaging transport (ITCM), and FIG. 7 illustrates an example electronic device 700. The server 600 could represent the BO server 235 and the reference base station 215 in FIG. 2, and the electronic device 700 could represent the GNSS receiver 206 in FIG. 2.

As shown in FIG. 6, the server 600 includes a bus system 605, which supports communication between at least one processing device 610, at least one storage device 615, at least one communications unit 620, and at least one input/output (I/O) unit 625.

The processing device 610 executes instructions that may be loaded into a memory 630. The processing device 610 may include any suitable number(s) and type(s) of processors or other devices in any suitable arrangement. Example types of processing devices 610 include microprocessors, microcontrollers, digital signal processors, field programmable gate arrays, application specific integrated circuits, and discreet circuitry.

The memory 630 and a persistent storage 635 are examples of storage devices 615, which represent any structure(s) capable of storing and facilitating retrieval of information (such as data, program code, and/or other suitable information on a temporary or permanent basis). The memory 630 may represent a random access memory or any other suitable volatile or non-volatile storage device(s).

The persistent storage 635 may contain one or more components or devices supporting longer-term storage of data, such as a ready only memory, hard drive, flash memory, or optical disc. The persistent storage 635 includes a first message 645, a second message 646. error correction data 647, satellite identification (ID) information 648, normalized data 649, and optimized error correction information 650. The persistent storage can include a repository to store data.

The communications unit 620 supports communications with other systems or devices. For example, the communications unit 620 could include a network interface card or a wireless transceiver facilitating communications over the network. The communications unit 620 may support communications through any suitable physical or wireless communication link(s).

The I/O unit 625 allows for input and output of data. For example, the I/O unit 625 may provide a connection for user input through a keyboard, mouse, keypad, touchscreen, or other suitable input device. The I/O unit 625 may also send output to a display, printer, or other suitable output device.

Note that while FIG. 6 is described as representing the BO server 235 of FIG. 2, the same or similar structure could be used in one or more of the reference station 215 or rover 205. For example, a laptop or desktop computer could have the same or similar structure as that shown in FIG. 6.

As described in more detail above, the server 600 optimizes global positioning system correction message for interoperable train control messaging transport and the electronic devices 700 optimizes global positioning system correction message for interoperable train control messaging transport.

As shown in FIG. 7, the electronic device 700 includes an antenna 705, a radio frequency (RF) transceiver 710, transmit (TX) processing circuitry 715, a microphone 720, and receive (RX) processing circuitry 725. The electronic device 700 also includes a speaker 730, a processor 740, an input/output (I/O) interface (IF) 745, an input 750, a display 755, a memory 760, and sensors 765. The memory 760 includes an operating system (OS) program 761 and one or more applications 762.

The RF transceiver 710 receives, from the antenna 705, an incoming RF signal transmitted by another component in a system. The RF transceiver 710 down-converts the incoming RF signal to generate an intermediate frequency (IF) or baseband signal. The IF or baseband signal is sent to the RX processing circuitry 725, which generates a processed baseband signal by filtering, decoding, and/or digitizing the baseband or IF signal. The RX processing circuitry 725 transmits the processed baseband signal to the speaker 730 (such as for voice data) or to the processor 740 for further processing (such as for web browsing data).

The TX processing circuitry 715 receives analog or digital voice data from the microphone 720 or other outgoing baseband data (such as web data, e-mail, or interactive video game data) from the processor 740. The TX processing circuitry 715 encodes, multiplexes, and/or digitizes the outgoing baseband data to generate a processed baseband or IF signal. The RF transceiver 710 receives the outgoing processed baseband or IF signal from the TX processing circuitry 715 and up-converts the baseband or IF signal to an RF signal that is transmitted via the antenna 705.

The processor 740 can include one or more processors or other processing devices and execute the OS program 761 stored in the memory 760 in order to control the overall operation of the electronic device 700. For example, the processor 740 could control the reception of forward channel signals and the transmission of reverse channel signals by the RF transceiver 710, the RX processing circuitry 725, and the TX processing circuitry 715 in accordance with well-known principles. In some embodiments, the processor 740 includes at least one microprocessor or microcontroller.

The processor 740 is also capable of executing other processes and programs resident in the memory 760. The processor 740 can move data into or out of the memory 760 as required by an executing process. In some embodiments, the processor 740 is configured to execute the applications 762 based on the OS program 761 or in response to signals received from external devices or an operator. The processor 740 is also coupled to the I/O interface 745, which provides the electronic device 700 with the ability to connect to other devices such as laptop computers and handheld computers. The I/O interface 745 is the communication path between these accessories and the processor 740.

The processor 740 is also coupled to the input 750 and the display unit 755. The operator of the electronic device 700 can use the input 750 to enter data into the electronic device 700. For example, the input 750 may be a keypad, touchscreen, button, etc. The display 755 may be a liquid crystal display or other display capable of rendering text and/or at least limited graphics, such as from web sites.

The memory 760 is coupled to the processor 740. Part of the memory 760 could include a random access memory (RAM), and another part of the memory 760 could include a flash memory or other read-only memory (ROM).

The sensors 765 could include any typical sensor found on an electronic device, including biometric sensors, location sensors, light sensors, proximity sensors, temperature sensors, vibration sensor, rotation sensors, global positioning system (GPS) sensors, etc.

As described in more detail above, the server 600 optimizes global positioning system correction message for interoperable train control messaging transport and the electronic devices 700 optimizes global positioning system correction message for interoperable train control messaging transport.

Although FIGS. 6 and 7 illustrate examples of devices in a computing system, various changes may be made to FIGS. 6 and 7. For example, various components in FIGS. 6 and 7 could be combined, further subdivided, or omitted and additional components could be added according to particular needs. As a particular example, the processor 740 could be divided into multiple processors, such as one or more central processing units (CPUs) and one or more graphics processing units (GPUs). Also, while FIG. 7 illustrates the electronic device 700 configured as a mobile telephone or smartphone, electronic devices could be configured to operate as other types of mobile or stationary devices. In addition, as with computing and communication networks, electronic devices and servers can come in a wide variety of configurations, and FIGS. 6 and 7 do not limit this disclosure to any particular electronic device or server.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A precision navigation system (PNS) for optimizing an error correction message for interoperable train control messaging transport (ITCM), comprising:
    a rover configured to:
        determine satellite identification information based on satellites in view of the rover, and
        transmit the satellite information to a back office (BO) server;
    a reference station configured to:
        receive error correction data from satellites in view of the reference station,
        transmit the error correction data to the BO server; and
    a back office (BO) server configured to:
        simultaneously receive:
            a first message containing error correction data from a reference station, and
            a second message containing satellite identification information from a rover,
        determine satellites that are common to the error correction data and the satellite identification information,
        normalize the common error correction data based on the determined satellites,
        generate an optimized error correction message based on the normalized data of the determined satellites, and
        transmit the optimized error correction message to the rover.

2. The PNS of claim 1, wherein a GNSS receiver of the reference station is configured to filter the error correction data for satellites that are outside of a viewing angle.

3. The PNS of claim 1, wherein the BO server is further configured to discard a first message that is older than a predetermined amount of time.

4. The PNS of claim 1, wherein a size of the first message is based on an amount of satellites observed by the reference station.

5. The PNS of claim 4, wherein a size of the optimized error correction message is determined based on an amount of satellites required for error correction by the rover.

6. The PNS of claim 5, wherein the size of the optimized error correction message is less than the size of the first message.

7. The PNS of claim 5, wherein a number of bits for the size of the optimized error correction message is determined by the following equation:

$$\text{Number of Bits} = 169 + N_{sat} * (10 + 43 * N_{sig}),$$

where $N_{sat}$ is a number of satellites in view of the reference station and $N_{sig}$ is a number of signals used.

8. A back office (BO) server for optimizing an error correction message for interoperable train control messaging transport (ITCM), comprising:
   a transceiver;
   a storage;
   a processor operatively coupled to the transceiver and the storage, the processor configured to:
      simultaneously receive:
         a first message containing error correction data from a reference station, and
         a second message containing satellite identification information from a rover,
      determine satellites that are common to the error correction data and the satellite identification information,
      normalize the common error correction data based on the determined satellites,
      generate an optimized error correction message based on the normalized data of the determined satellites, and
      transmit the optimized error correction message to the rover.

9. The BO server of claim 8, wherein a GNSS receiver of the reference station filters the error correction data for satellites that are outside of a viewing angle.

10. The BO server of claim 8, wherein the processor is further configured to discard a first message that is older than a predetermined amount of time.

11. The BO server of claim 8, wherein a size of the first message is based on an amount of satellites observed by the reference station.

12. The BO server of claim 11, wherein a size of the optimized error correction message is determined based on an amount of satellites required for error correction by the rover.

13. The BO server of claim 12, wherein the size of the optimized error correction message is less than the size of the first message.

14. The BO server of claim 12, wherein a number of bits for the size of the optimized error correction message is determined by the following equation:

$$\text{Number of Bits} = 169 + N_{sat} * (10 + 43 * N_{sig}),$$

where $N_{sat}$ is a number of satellites in view of the reference station and $N_{sig}$ is a number of signals used.

15. A method for optimizing an error correction message for interoperable train control messaging transport (ITCM), comprising:
   simultaneously receiving:
      a first message containing error correction data from a reference station, and
      a second message containing satellite identification information from a rover;
   determining satellites that are common to the error correction data and the satellite identification information;
   normalizing the common error correction data based on the determined satellites;
   generating an optimized error correction message based on the normalized data of the determined satellites; and
   transmitting the optimized error correction message to the rover.

16. The method of claim 15, wherein the error correction data is filtered, by a GNSS receiver of the reference station, for satellites that are outside of a viewing angle.

17. The method of claim 15, further comprising:
   discarding a first message that is older than a predetermined amount of time.

18. The method of claim 15, wherein a size of the first message is based on an amount of satellites observed by the reference station.

19. The method of claim 18, wherein a size of the optimized error correction message is determined based on an amount of satellites required for error correction by the rover.

20. The method of claim 19, wherein the size of the optimized error correction message is less than the size of the first message.

* * * * *